United States Patent
Sanders et al.

(10) Patent No.: US 11,303,583 B2
(45) Date of Patent: *Apr. 12, 2022

(54) RESOURCE TREES BY MANAGEMENT CONTROLLER

(71) Applicant: Hewlett Packard Enterprise Development LP, Houston, TX (US)

(72) Inventors: Sherrilyn L. Sanders, Loomis, CA (US); Michael R. Garrett, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,077

(22) Filed: Dec. 4, 2020

(65) Prior Publication Data
US 2021/0092073 A1 Mar. 25, 2021

Related U.S. Application Data

(63) Continuation of application No. 15/504,357, filed as application No. PCT/US2014/053314 on Aug. 29, 2014, now Pat. No. 10,887,249.

(51) Int. Cl.
*H04L 12/911* (2013.01)
*H04L 47/70* (2022.01)
*H04L 12/64* (2006.01)
*H04L 41/0233* (2022.01)

(52) U.S. Cl.
CPC .......... *H04L 47/82* (2013.01); *H04L 12/6418* (2013.01); *H04L 41/0233* (2013.01)

(58) Field of Classification Search
CPC .. H04L 12/6418; H04L 41/0233; H04L 47/82
See application file for complete search history.

(56) References Cited

U.S. PATENT DOCUMENTS

| | | | |
|---|---|---|---|
| 8,631,387 | B2 | 1/2014 | Henderson |
| 8,655,989 | B2 | 2/2014 | Ritter et al. |
| 9,032,077 | B1 | 5/2015 | Klein et al. |

(Continued)

OTHER PUBLICATIONS

Demchak, B., Policy Down Development: SOA Evolvability Through Late Binding, Jan. 3, 2013, 499 Pgs., https://www.google.com/uri?sa=t&rct=j&q=&esrc=s&source=web&cd=1&cad=rja&uact=8&ved=0CCgQFjAA&url=https%3A%2Fsosa.ucsd.edu%2FResearchCentral%2Fdownload.jsp%3Fid%3D224&ei=jR5zU-jBF6Se7AaqjoDACQ&usg=AFQjCNE7-jYejbkM1ReurNzObgQMoacoQ&sig2=DG68G-ky7L4YHXYMYuv3Zq&bvrn=bv.66699033,d.ZGU >.

(Continued)

*Primary Examiner* — Gil H. Lee
*Assistant Examiner* — Juan C Turriate Gastulo
(74) *Attorney, Agent, or Firm* — Hewlett Packard Enterprise Patent Department

(57) ABSTRACT

Techniques for management controllers are provided. In one aspect, a processor of a resource registration service of a management controller may receive, from a resource provider, a resource registration request to allocate a resource object in a data model. The resource registration request may include an indication that the resource object is to be joined to a public resource tree. The processor may then allocate the resource object within the data model. In allocating the resource object, the processor may update the public resource tree to link to the resource object based on the indication.

15 Claims, 5 Drawing Sheets

(56) References Cited

U.S. PATENT DOCUMENTS

| | | | |
|---|---|---|---|
| 2003/0101300 A1* | 5/2003 | Goldick | G06F 9/52 |
| | | | 710/200 |
| 2005/0165815 A1 | 7/2005 | Ozzie et al. | |
| 2006/0149761 A1 | 7/2006 | Kim et al. | |
| 2008/0155100 A1 | 6/2008 | Ahmed | |
| 2009/0254519 A1 | 10/2009 | Ma | |
| 2009/0327250 A1 | 12/2009 | Green | |
| 2011/0173307 A1* | 7/2011 | Yu | H04W 4/00 |
| | | | 709/222 |
| 2011/0302198 A1 | 12/2011 | Baby et al. | |
| 2012/0284290 A1 | 11/2012 | Keebler et al. | |
| 2012/0331122 A1* | 12/2012 | Kakivaya | G06F 16/10 |
| | | | 709/223 |
| 2013/0036476 A1 | 2/2013 | Roever et al. | |
| 2013/0187926 A1 | 7/2013 | Silverstein et al. | |
| 2013/0198868 A1 | 8/2013 | Georgiev | |
| 2013/0275379 A1 | 10/2013 | Trebas | |
| 2014/0082586 A1 | 3/2014 | Casey et al. | |

OTHER PUBLICATIONS

International Searching Authority, The International Search Report and the Written Opinion, PCT/US2014/053314, dated May 18, 2015, 12 Pgs.

Jens; "How to Build an RSS Sync System: a Brain-dump"; Mar. 14, 2013, 3 Pgs., http://snej.soup.io/post/304331585/How-To-Build-An-RSS-Sync-System.

* cited by examiner

RESOURCE TREES BY MANAGEMENT CONTROLLER

CROSS-REFERENCE TO RELATED APPLICATION

This application is a Continuation of U.S. application Ser. No. 15/504357, filed on Feb. 16, 2017, which is the National Stage of International Application No. PCT/US2014/053314, filed on Aug. 29, 2014, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

As the number of computer servers used by businesses has substantially increased, a number of techniques have been developed to remotely manage the operation of such servers. For example, large data centers are frequently managed using a variety of different remote management tools, including, e.g., simple terminal connections, remote desktop applications and sophisticated software tools used to configure, monitor, and troubleshoot both computer hardware and software.

DETAILED DESCRIPTION

Figure 1:
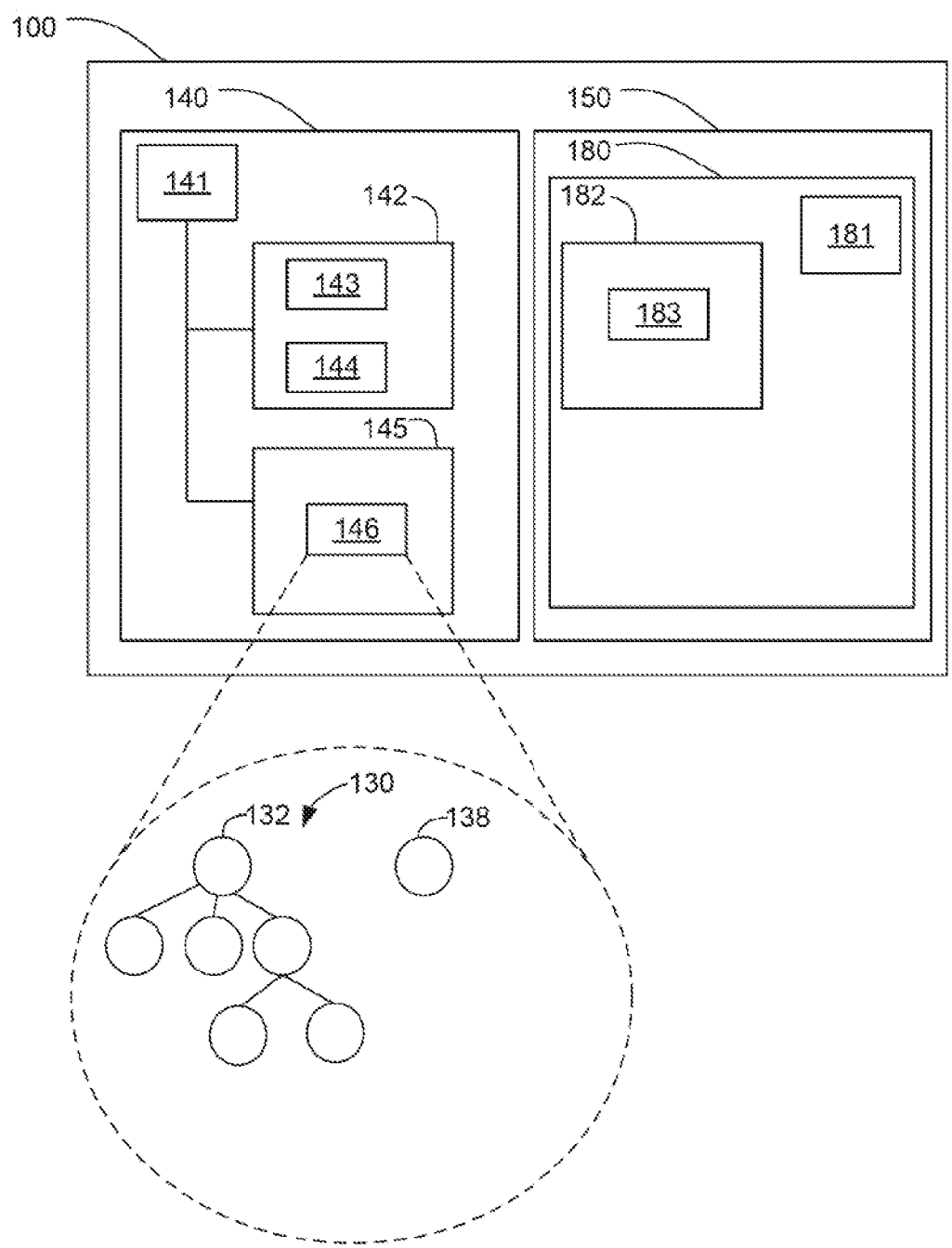
FIG. 1 is block diagram illustrating a computer system that may utilize a resource tree on a management controller, in accordance to examples described herein.

System resource information is data that characterizes a resource within a network device. A resource may include any combination of components, software, services, and state data operating within the network device. One mechanism for obtaining system resource information is to run an application program that queries the installed resources for information such as hardware identifiers, firmware versions, driver versions, supported features, and any other such information regarding the resources installed in the network device. This system resource information may be collected in a file, which can then be made available external to the server (e.g. out of band).

However, relying on an application to collect such information may pose some issues. For example, an issue that may arise when using an application program to query resources of the network device is that such an approach may cause the application program to become tightly coupled to the application programming interfaces (APIs), data structures, and schemas defined by the resources being queried. In cases where a network device includes resources provided by multiple manufacturers, the application program may then implement complex logic for handling each variation of API, data structure, schema, used across the various resource providers. Further, over time, a resource provider could modify an API, data structure, or schema, which would cause the application to be incompatible with the updated API, data structure, or schema.

These interoperability challenges may extend beyond the application program. For example, an external client that interfaces with the application program and consumes the system resource information will likewise include logic for handling the variations of APIs, data structures, and schemas used by the various resource providers. Further, the external client will likewise have to update the logic for handling the variations of APIs, data structures, and schemas as the various resource providers make changes to these elements.

The techniques described in the foregoing may, in some cases, be used to overcome some of the issues associated with collecting system resource information from an application program. For example, a network device may include a management controller that provides a registration service in which resource providers of the network device can use to register system resource information. The management controller may maintain a data model of the system resource information using graph of resource objects. A resource object may be data and/or logic that characterizes a resource of a network device through name-value pairs that express property names and property values for that resource. By way of example and not limitation, JavaScript Object Notification (JSON) is an example format usable to express resource objects.

To improve interoperability of the data model, the management controller may provide a service for resources to register resource objects in a data model. The management controller and/or the resource provider may organize the resource objects as a tree structure of resource objects (also referred to as a resource tree). The resource objects may be linked to each other using link properties. A link property may be a property of a resource object with a determinable property name (e.g., "href") and a corresponding value that specifies the link (e.g., a URI) to the next resource object in the resource tree. In this way, on the client-side, a client may use a web-crawler to traverse the resource tree by requesting the resource objects linked by the determinable property name.

Further, in some cases, the management controller may include an interface for resources to register hidden resource objects in the data model A hidden resource object may be a resource object in the data model that is disjoined from the public resource tree. A public resource tree may be a resource tree in which the root resource object is referenced by a determinable object identifier. For example, the management controller may publish a URI assigned to a root resource object from the resource tree so that client can use that URI to obtain the root resource tree and, from there, traverse the resource tree. However, because a hidden resource object is disjoined from the public resource tree, a client would be unable to discover the hidden resource object through a traversal of the public resource tree.

Thus, according to an example, a processor of a resource provider of a network device may create a resource registration request that requests a management controller to allocate a resource object in a data model. The resource registration request may include an indication to join the resource object to a public resource tree in the data model. The processor may also cause the management controller to allocate the resource object such that the resource object is joined to the public resource tree. In some cases, the processor can cause the management controller to allocate the resource object by sending the resource registration request to the management controller.

Further, according to another example, a processor of a resource registration service of a management controller may receive, from a resource provider, a resource registration request to allocate a resource object in a data model. The resource registration request may include an indication that the resource object is to be joined to a pubic resource tree. The processor may then allocate the resource object within the data model. In allocating the resource object, the processor may update the public resource tree to link to the resource object based on the indicator.

These examples and others are now described in the foregoing.

For example, FIG. 1 is block diagram illustrating a computer system that may utilize a resource tree on a management controller, in accordance to examples described herein. In some cases, the system may represent a network device, such as a server, router, switch, and the like. In other cases, the network device may represent any suitable computer device, such as a desktop, laptop, game console, set top box, tablet, mobile phone, or the like. With reference to FIG. 1, the computer system 100 may include a management controller 140 and a host environment 150.

The management controller 140 may be a baseboard management controller. The management controller may remain powered on and accessible to a client, even when the remainder of the computer system 100 is not powered on. Thus, a client may still access the management controller 140, even when the remainder of computer system 100 is unavailable. Furthermore, the management controller 140 may be accessible over a different communications path than that which is used to communicate with the host environment 140. Thus, the management controller may be referred to as being accessible out-of-band.

The management controller 140 may include a processor 141 and a computer-readable storage device 142. The processor 141 may be a device suitable to read and execute processor executable instructions. The processor executable instructions may cause the processor to implement techniques described herein. For example the instructions may cause the processor to implement the resource tree techniques described herein.

The processor 141 may be coupled to the computer-readable storage device 142. The computer-readable storage device 142 may contain thereon a set of instructions, which when executed by the processor 141, cause the processor 141 to execute the techniques described herein. For example, the medium may include resource registration service instructions 143 and resource object retrieval instructions 144. Execution of these instructions to provide the functionality described herein is described in further detail below.

The processor 141 may also be coupled to a resource object data model data store 145 that stores a data model of resources in the computer system 100. The resource object data model data store 145 may be implemented in volatile or non-volatile memory. The processor 141, while executing the resource object retrieval instructions 144 and the resource registration service instructions 143, may provide interfaces for a resource provider of the computer system 100 to register a resource object with the resource object data model and for clients to obtain resource objects with the data model stored in the data store 145, as will be described in further detail below. For example, the resource object data model store 145 may store a data model 146 that includes a public resource tree 130 and a hidden resource object 138.

The public resource tree 130 may be a collection of resource objects that are linked together (either directly or indirectly) from a root resource object 132. The root resource object 132 may be assigned an object identifier that is published to clients. In this way, a client can request the root resource object 132 by the well-known object identifier. Further, the root resource object 132 may include link properties that reference other resource objects, and those resource objects can, in turn, include link properties that reference other resource objects. Thus, clients may discover resources of the computer system 100 by traversing resource objects staring from the root resource object. In cases where the resource objects are JSON objects, the link properties may be in the form "href": "childresourceobject" where href is an established name for a link property and childresourceobject is an object identifier (e.g., a URI) for an resource object that has a child relationship to the referencing resource object.

The hidden resource object 138 may be a resource object that is disjoined from the public resource tree. A hidden resource object may be disjoined from a resource tree when the resource tree lacks any link properties referencing the hidden resource object. Thus, the hidden resource object is not discoverable by traversing the public resource tree. Instead, a client can obtain the hidden resource object by requesting the object identifier assigned to the hidden resource object.

The host environment 150 may include devices that support the underlying execution environment for computer system 100. For example, where the computer system 100 is a server, the host environment 150 may include the devices used provide the underlying execution environment of a server. From the perspective of the management controller, these devices may be referred to as a resource providers. For purposes of ease of description, only one resource provider 180 is shown. However, it should be understood that the host environment 150 may include any number of resource providers 180. Example resource providers may include network interface controllers, host bus adaptors, firmware, input/output cards, storage devices, applications, or any other type of device or resource that may be controlled by or otherwise communicate with the management controller 140.

In an example, the resource provider 180 and the management controller 140 may communicate over defined interfaces, depending on implementation. By way of example and not limitation, the defined interfaces may define protocols to communicate information regarding firmware, version information, vendor specified information, configuration data, state data, and the like.

The resource provider 180 may include a processor 181 which may be a device suitable to read and execute processor executable instructions. The processor executable instructions may cause the processor to implement techniques described herein. For example the instructions may cause the processor to implement the resource tree techniques described herein.

The processor 181 may be coupled to the computer-readable storage device 182. The computer-readable storage device 182 may contain thereon a set of instructions, which when executed by the processor 181, cause the processor 181 to execute the techniques described herein. For example, the storage device 182 may include object publisher instructions 183 that when executed by the processor 181, provides functionality for an object publisher module. Execution of these instructions to provide the functionality described herein is described in further detail below, such as, for example, with reference to FIGS. 2 and 4.

Figure 2:
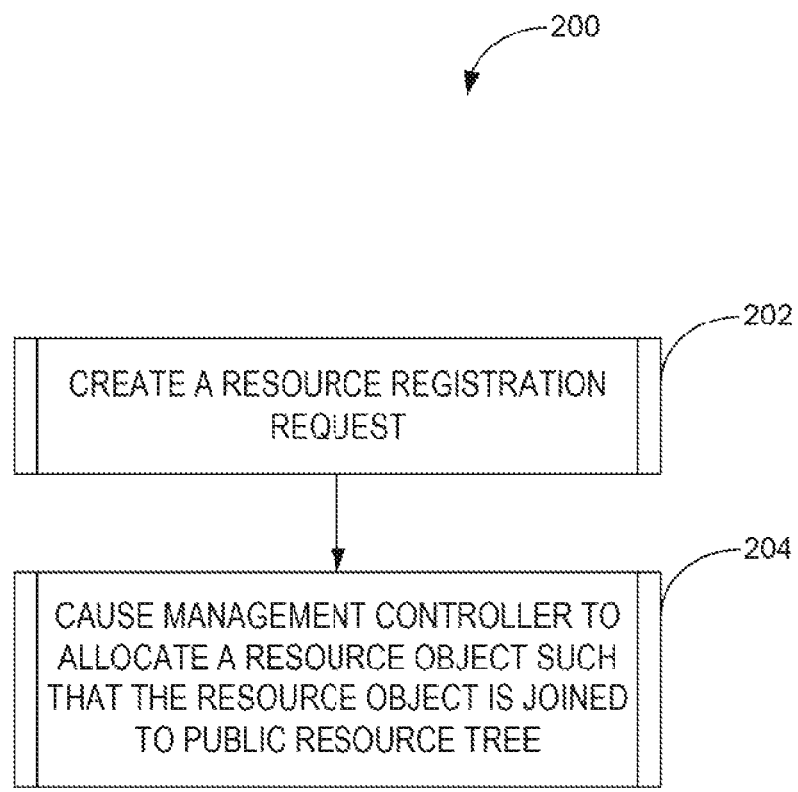
FIG. 2 is a high level flow diagram for a method of registering a resource object with the data model such that the resource object is joined to the public resource tree, according to techniques described herein.

FIG. 2 is a high level flow diagram for a method 200 of registering a resource object with the data model such that the resource object is joined to the public resource tree, according to techniques described herein. The method 200 may be performed by the modules, logic, components, or systems shown in FIG. 1, such as an object publisher module implemented by a processor in executing the resource publisher module instructions, and, accordingly, is described herein merely by way of reference thereto. It is be appreciated, however, that the method 200 may be performed on any suitable hardware.

The method 200 may begin at operation 202 when the object publisher module of a resource provider creates a resource registration request that represents a request to allocate a resource object that is joined to the public resource tree. In an example, the resource registration request may include a number of fields, including, among other things, a requested reference which may be a portion of an object identifier (e.g., a URI) that the resource provider is requesting to be assigned to the resource object being allocated. In some cases, but not all cases, the resource registration request may also include an indication of whether the resource object is to be joined to the public resource tree. In some cases, the indication of whether the requested resource object to be joined to the resource tree may be reflected using a parameter, a name value property, a given API call, or the like. For example, the resource registration request may include a parent parameter that specifies the resource object that is to be the parent of the resource object that the resource registration request is requesting to be allocated. In other cases, the indication may be inferred from the resource object reference identifier requested by the resource provider. For example, the URI /rootObject/Provider/Resource1 may suggest that the resource object Resource1 is to be allocated along a path that includes the root resource object (rootObject) and the provider resource object (e.g., Provider).

At operation 204, the resource object publisher may cause the management controller to create a resource object in the data model such that the created resource object is joined to the public resource tree. In some cases, the resource object publisher may cause the management controller to create the resource object by sending the resource registration request to the management controller. In some cases, the resource registration request is a POST command to /rootObject/provider, where /rootObject refers to the root of the public resource tree maintained by the management controller and /provider refers to an identifier of the resource provider requesting the registration of a resource object. See the description of FIG. 3 for examples of creating a resource object that is joined to the public resource tree.

Figure 3:
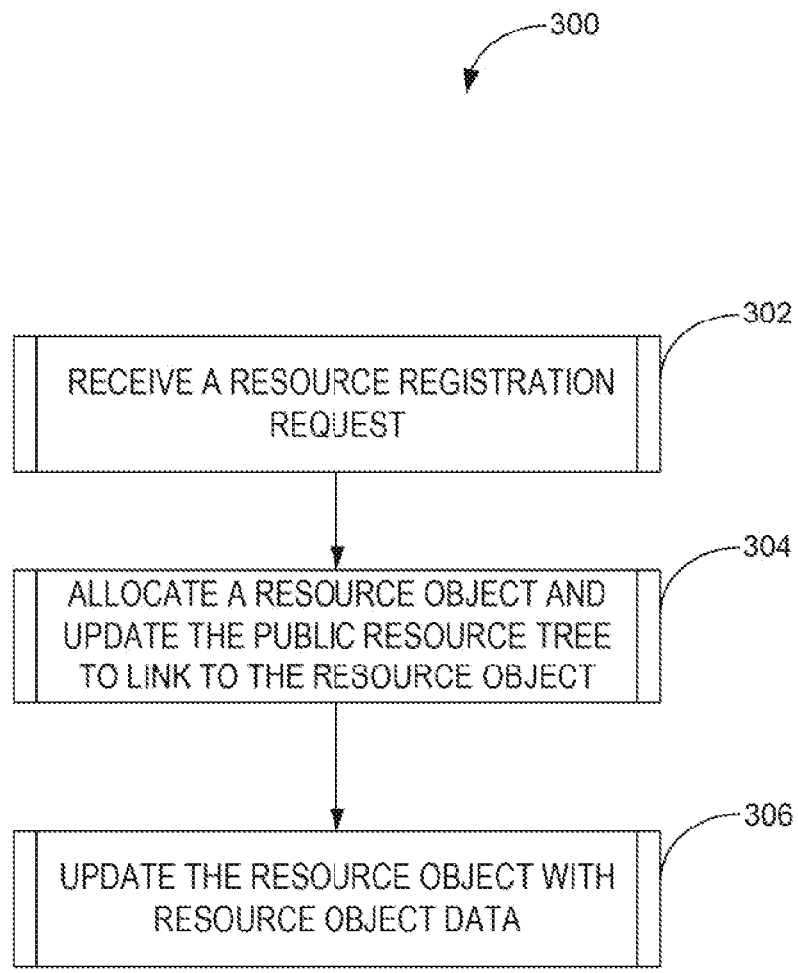
FIG. 3 is a high level flow diagram for a method of registering a resource object with the data model such that the resource object is joined to the public resource tree, according to techniques described herein.

FIG. 3 is a high level flow diagram for a method 300 of registering a resource object with the data model sum that the resource object is joined to the public resource tree, according to techniques described herein. The method 300 may be performed by the modules, logic, components, or systems shown in FIG. 1, such as a registration service provided by the processor in executing the registration service instructions, and, accordingly, is described herein merely by way of reference thereto. It is be appreciated, however, that the method 300 may be performed on any suitable hardware.

The method 300 may begin at operation 302 when the registration service of the management controller receives a resource registration request from a resource provider within the network device. In some cases, the resource registration request is a POST command to /rootObject/provider, where /rootObject refers to the root of the resource tree maintained by the management controller and /provider refers to an identifier of the resource provider requesting the registration of a resource object. In an example, the resource registration request may include a number of fields, including, among other things, a requested reference which may be a portion of a resource location identifier (e.g., a URI) that the resource providers requesting. In some cases, but not all cases, the resource registration request may also include an indication of whether the requested resource object is to be joined to the resource tree or not. In some cases, the indication of whether the requested resource object to be joined to the resource tree may be reflected using s parameter, a name value property, a given API call, or the like. In other cases, the indication may be inferred from the resource object reference identifier requested by the resource provider. For example, if the requested resource object reference identifier begins at the root resource object then the resource registration service may determine that the resource object is to be joined to the public resource tree.

At operation 304, the registration service allocates a resource object within the data model and, in some cases, returns a reference to the created object back to the external provider. A resource provider registering with the registration service may indicate where in the URI space it wishes to publish a resource. However, in some cases, a provider will not have enough information to know the full URI path, so the registration service may use information from the resource registration request to establish the URI. As an example but not a limitation, a NIC may register a resource object at a URI based upon a determination that the NIC is contained in a system within the network device. However, a NIC may not know which system the NIC is contained within or how to de-conflict URI allocations with other NICs. Therefore, the registration service may take provided information and create the URIs on behalf of the resource provider. This is, the registration service may determine which system the resource registration request is originating and augment the URI included in the resource registration request to corresponding to that system. The URI allocated to the NIC may then be based on the augmented URI.

In addition to allocating a URI, operation 304, in some cases, may involve the registration service updating the resource tree to include references to the newly created resource objects being registered by the provider. For example, the registration service may update resource objects that are part of the resource tree to now include references to the newly created object. As an example, as the management controller may "own" the root resource object and, accordingly, the registration service, being a service of the management controller, may create a reference property within the root resource object that links the root resource object to the newly created resource object. Creating a reference property within the root resource object that links the root resource object to the newly created resource object may involve the registration service adding a linking property (e.g., a href property) with a value corresponding to the URI allocated to the newly created resource object.

At operation 306, the registration service may update the allocated resource object with resource object data received by the resource provider. In some cases, the resource object data may be received as part of the resource registration request or, in other cases, as a separate message. If the resource object data is sent as a separate message, the reference assigned at operation 304 may be included in the separate message to properly identify the resource object within the data model that is to be updated using the resource object data. The resource object data may be an abstract object (e.g., a JSON object) that characterizes properties (e.g., using property name—property value pairs) of the resource being registered by the resource provider.

The method 300 may be repeated when the resource interface receives resource registration requests from the same or other resource providers. Thus, the method 300 may be performed to build-up a fully connected resource tree of the resources that are publicly available in the system 100.

Thus, FIGS. 2-3 describe techniques for adding resource objects to the data model maintained by the management controller such that the resource object is joined to the public resource tree. This allows a client to be able to request the root resource object and then traverse the resource tree via the link properties embedded in the resource objects. However, in some cases, a resource provider may want to add a resource object to the data model where the resource object is a hidden resource object. A hidden object is a resource object that is disjoined from the public resource tree. Thus, a client would be unable to discover the hidden object by traversing link properties found in the resource objects of the public resource tree. An example of a use for a hidden object is Field Service BIOS Settings. The firmware would register auxiliary resources representing hidden Current Configuration/Setting Data resources, marking them hidden. These resources would not appear in the resource object tree (because they are auxiliary resources and presumably the master object wouldn't provide a link). Rather, to access these hidden objects, a client would know specifically how to access the object directly by URI.

Figure 4:
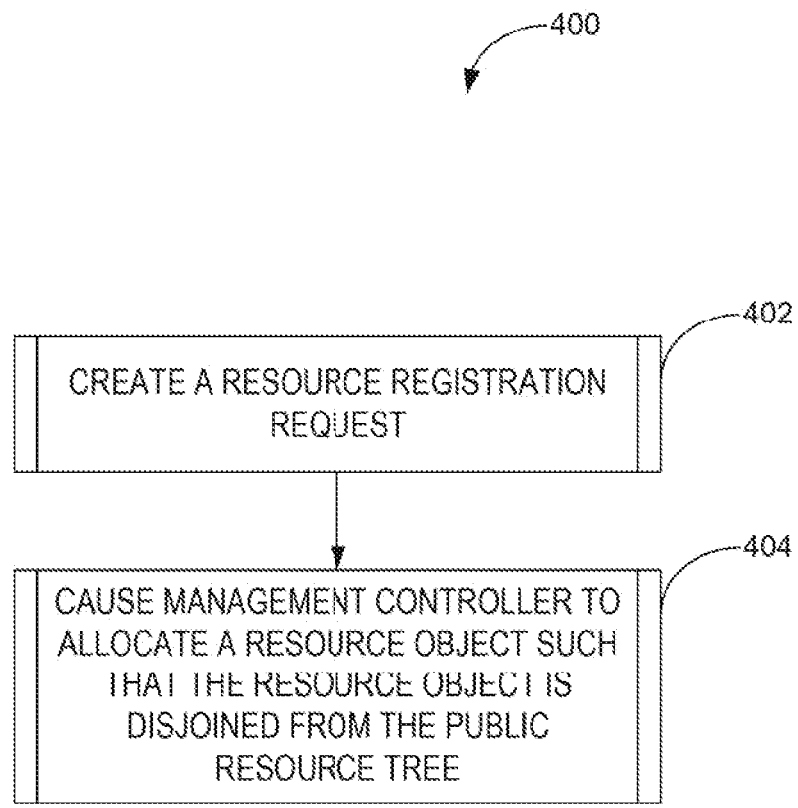
FIG. 4 is a high level flow diagram for a method of registering a resource object with the data model such that the resource object is disjoined from the public resource tree, according to techniques described herein.

FIG. 4 is a high level flow diagram for a method 400 of registering a resource object with the data model such that the resource object is disjoined from the public resource tree, according to techniques described herein. The method 400 may be performed by the nodules, logic, components, or systems shown in FIG. 1, such as an object publisher module implemented by a processor in executing the resource publisher module instructions, and, accordingly, is described herein merely by way of reference thereto. It is be appreciated, however, that the method 400 may be performed on any suitable hardware.

The method 400 may begin at operation 402 when the object publisher module of a resource provider creates a resource registration request that represents a request to allocate a resource object that is disjoined from the public resource tree. In an example, the resource registration request may include a number of fields, including, among other things, a requested reference which may be a portion of a resource object reference identifier (e.g., a URI) that the resource provider is requesting to be assigned to the resource object being allocated. In some cases, but not all cases, the resource registration request may also include an indication whether the resource object is to be disjoined from the public resource tree. In some cases, the indication of whether the requested resource object to be disjoined from the resource tree may be reflected using a parameter, a name value property, a given API call, or the like. For example, the resource registration request may include a parent parameter that specifies the resource object that is to be the parent of the resource object that the resource registration request is requesting to be allocated and this parent parameter may include a reference to a resource object that is not connected (directly or indirectly) to the root resource object. In other cases, the indication may be inferred from the resource object reference identifier requested by the resource provider. For example, the URI /Provider/Resource1 may suggest that the resource object Resource1 is to be allocated along a path that includes that begins at the resource object Provider rather than the root resource object (e.g., rootObject) of the public resource tree.

At operation 404, the resource object publisher may cause the management controller to create a resource object in the data model such the created resource object is disjoined from the public resource tree by sending the resource registration request to the management controller. In some cases, the resource registration request is a POST command to /rootObject/provider, where /rootObject refers to the root of the public resource tree maintained by the management controller and /provider refers to an identifier of the resource provider requesting the registration of a resource object. See the description of FIG. 5 for examples of creating a resource object that is joined to the public resource tree.

Figure 5:
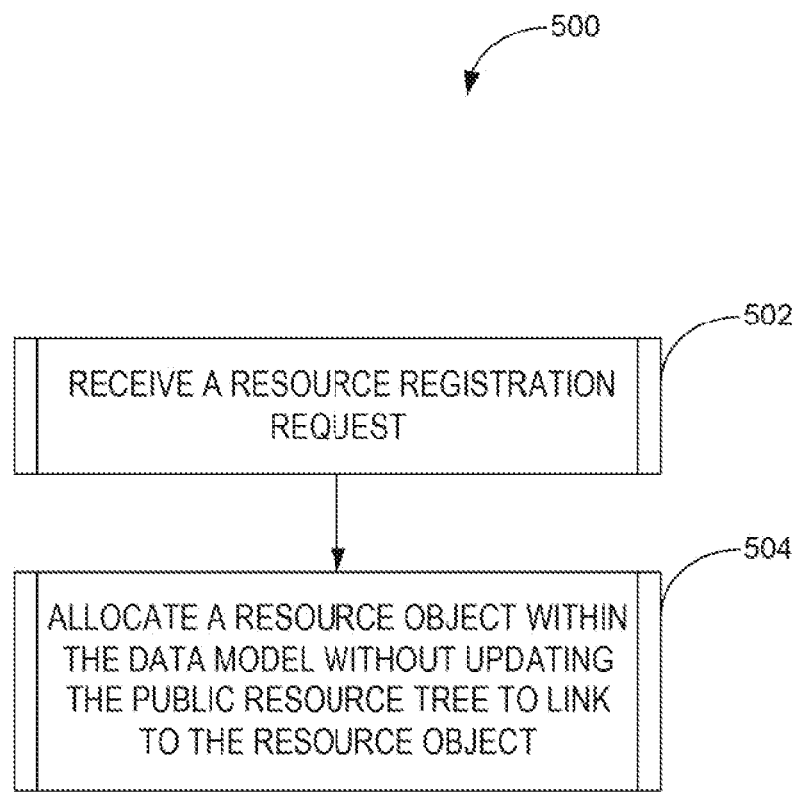
FIG. 5 is a high level flow diagram for a method of registering a resource object with the data model such that the resource object is disjoined from the public resource tree, according to techniques described herein.

FIG. 5 is a high level flow diagram for a method 500 of registering a resource object with the data model such that the resource object is disjoined from the public resource tree, according to techniques described herein. The method 500 may be performed by the modules, logic, components, or systems shown in FIG. 1, such as a registration service provided by the processor in executing the registration service instructions, and, accordingly, is described herein merely by way of reference thereto. It is be appreciated, however, that the method 500 may be performed on any suitable hardware.

The method 500 may begin at operation 502 when the registration service of the management controller receives a resource registration request from a resource provider within the network device. In some cases, the resource registration request is a POST command to /rootObject/provider, where /rootObject refers to the root of the resource tree maintained by the management controller and /provider refers to an identifier of the resource provider requesting the registration of a resource object. In an example, the resource registration request may include a number of fields, including, among other things, a requested reference which may be a portion of a resource location identifier (e.g., a URI) that the resource provider is requesting. In some cases, but not all cases, the resource registration request may also include an indication of whether the requested resource object is to be disjoined from the public resource tree or not. In some cases, the indication of whether the requested resource object to be disjoined from the public resource tree may be reflected using a parameter, a name value property, a given API call, or the like. In other cases, the indication may be inferred from the resource object reference identifier requested by the resource provider. For example, if the requested resource object reference identifier begins at the root resource object then the resource registration service may determine that the resource object is to be joined to the public resource tree.

At operation 504, based on the indication that the requested resource object is to be disjoined from the public resource tree, the registration service allocates a resource object within the data model without updating the public resource tree to link to the newly allocated resource object.

What is claimed is:

1. A method comprising:
creating, by a processor of a resource provider of a network device, a resource registration request that requests a management controller to allocate a resource object in a data model, the resource registration request comprising:
an indication to join the resource object to a public resource tree in the data model at a location along a path of the public resource tree, and
a first resource object identifier of the resource object;
causing, by the processor of the resource provider, the management controller to allocate the resource object such that the allocated resource object is joined to the public resource tree,
wherein causing the management controller to allocate the resource object includes sending the resource registration request to the management controller,
wherein the allocating of the resource object includes determining a system the resource registration request originated from,
augmenting the first resource object identifier based on information identifying the system in which the resource provider is contained to produce an augmented resource object identifier that refers to the resource provider in the system, and
assigning the augmented resource object identifier to the allocated resource object.

2. The method of claim 1, further comprising:
receiving, by the processor of the resource provider from the management controller, a reference to the allocated resource object that is joined to the public resource tree based on adding a linking property to a plurality of resource objects of the public resource tree, the linking property to link the plurality of resource objects to the allocated resource object such that the allocated resource object is discoverable through traversal of the public resource tree.

3. The method of claim 1, further comprising using, by the processor, the allocated resource object to store system resource information of a resource of the resource provider.

4. The method of claim 1, wherein the first resource object identifier includes a portion of a uniform resource identifier (URI) comprising a path that includes a root resource object of the public resource tree.

5. The method of claim 1, wherein the indication to join the resource object to the public resource tree in the data model includes a parent parameter that references a resource object, within the public resource tree, that is to be a parent of the resource object to be allocated based on the resource registration request.

6. The method of claim 1, further comprising:
creating, by the processor, an additional resource registration request that requests the management controller to allocate an additional resource object in the data model, the additional resource registration request including an additional indication that the additional resource object is to be disjoined from the public resource tree; and
causing, by the processor, the management controller to allocate the additional resource object such that the additional resource object is disjoined from the public resource tree, wherein causing the management controller to allocate the additional resource object includes sending the additional resource registration request to the management controller.

7. A non-transitory storage medium comprising instructions that upon execution cause a management controller to:
receive, from a resource provider, a resource registration request to allocate a resource object in a data model, the resource registration request comprising:
an indication to join the resource object to a public resource tree at a location along a path of the public resource tree, and
a first resource object identifier of the resource object;
allocate, in response to the resource registration request, the resource object within the data model to join the allocated resource object to the public resource tree;
determine a system the resource registration request originated from, wherein the resource provider is contained in the system;
augment the first resource object identifier based on information identifying the system in which the resource provider is contained, the augmenting producing an augmented resource object identifier that refers to the resource provider in the system; and
assign the augmented resource object identifier to the allocated resource object.

8. The non-transitory storage medium of claim 7, wherein the instructions upon execution cause the management controller to:
responsive to joining the allocated resource object to the public resource tree, add a linking property to each of a plurality of resource objects of the public resource tree, the linking property to link the plurality of resource objects to the allocated resource object such that the allocated resource object is discoverable through traversal of the public resource tree.

9. The non-transitory storage medium of claim 8, wherein the instructions upon execution cause the management controller to:
receive an additional resource registration request to allocate an additional resource object in the data model, the additional resource registration request including an indication that the additional resource object is to be disjoined from the public resource tree; and
based on the indication that the additional resource object is to be disjoined from the public resource tree, allocate the additional resource object within the data model without updating the public resource tree.

10. The non-transitory storage medium of claim 7, wherein the allocated resource object includes any combination of data relating to a component, software, a service, and state data operating within a network device.

11. The non-transitory storage medium of claim 7, wherein the instructions upon execution cause the management controller to publish, to the resource provider, an object identifier assigned to a root resource object of the public resource tree.

12. The non-transitory storage medium of claim 7, wherein the linking property comprises the augmented resource object identifier, and wherein the instructions upon execution cause the management controller to:
return the augmented resource object identifier to the resource provider.

13. The non-transitory storage medium of claim 7, wherein the allocation of the resource object includes update of a root resource object to include the linking property.

14. The non-transitory storage medium of claim 13, wherein the linking property includes a name and a value, the name being href and the value being the augmented resource object identifier.

15. The non-transitory storage medium of claim 7, wherein the allocated resource object includes system resource information that is formatted as a Java Script Object Notation (JSON) object.

\* \* \* \* \*